Feb. 12, 1946.　　　E. A. WINFIELD　　　2,394,576
INTERNAL-COMBUSTION ENGINE HEAD
Filed Sept. 23, 1944　　　2 Sheets-Sheet 1

Inventor
EDWARD A. WINFIELD
By Strauch & Hoffman
Attorneys

Feb. 12, 1946.    E. A. WINFIELD    2,394,576
INTERNAL-COMBUSTION ENGINE HEAD
Filed Sept. 23, 1944    2 Sheets-Sheet 2
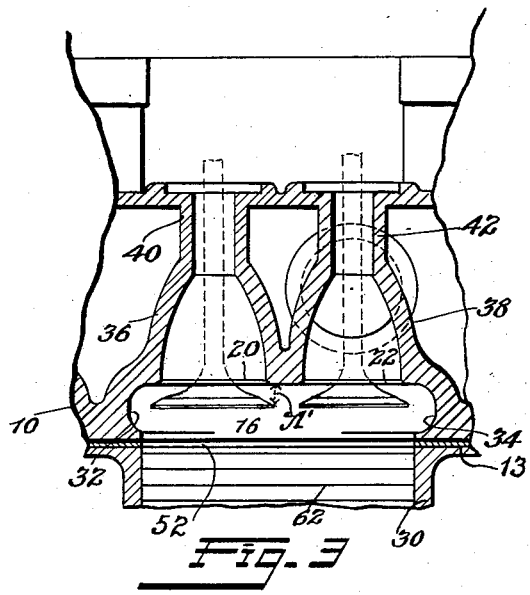
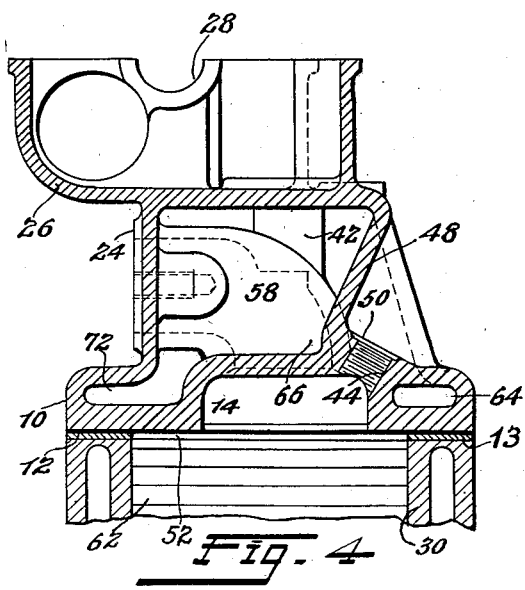 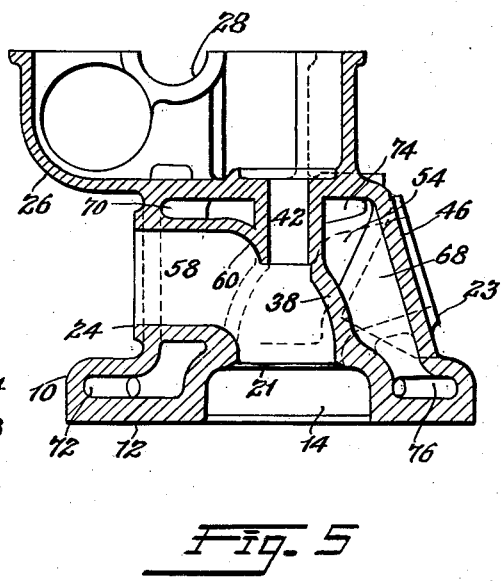
INVENTOR.
EDWARD A. WINFIELD
BY Strauch & Hoffman
ATTORNEYS Patented Feb. 12, 1946

2,394,576

UNITED STATES PATENT OFFICE 2,394,576

INTERNAL-COMBUSTION ENGINE HEAD

Edward A. Winfield, Los Angeles, Calif.

Application September 23, 1944, Serial No. 555,516

9 Claims. (Cl. 123—173)

This invention relates to improvements in internal combustion engines and has particular reference to an improved cylinder head and combustion chamber construction for such an engine.

The present invention is directly concerned with improved cylinder heads for engines of the four-cycle type having overhead valves. It is an improvement on the internal combustion engine cylinder head disclosed in my prior Patent Number 2,126,939, issued August 16, 1938, and provides an improved performance over engines constructed in accordance with the disclosure of the patent. By reason of factors such as improved volumetric efficiency and controlled combustion of the compressed gases accomplished by the improved construction it has been found possible to obtain a substantial increase in horsepower in comparison with a conventional engine of the same displacement. Also, by providing a cylinder head construction of high thermal efficiency, in combination with detonation suppressing features, it has been possible to reduce thermal losses, and thus make it possible to decrease the capacity of the necessary heat radiation facilities.

It is, therefore, an important object of the invention to provide an improved engine cylinder head having intake and exhaust passages and combustion chambers formed to provide improved volumetric efficiency for the engine.

A further object resides in the provision of an improved engine cylinder head having water jacket space completely surrounding the intake and exhaust passages and the combustion chambers so as to maintain uniform temperatures throughout.

A still further object resides in the provision of an improved engine cylinder head having internal walls of substantially uniform thickness and smoothly curved to avoid sharp corners or edges subject to overheating and insure a smooth substantially streamlined flow of intake and exhaust gas therethrough.

An additional object resides in the provision of an improved engine cylinder head having therein combustion chambers of small area and narrow extent between the side walls thereof to provide detonation inhibiting conditions while promoting advantageous flame propagation with the use of a single spark plug.

It is also the purpose of my present invention to provide an engine cylinder head having a combustion chamber of small size in relation to the engine cylinder bore, so that at the top dead center position of the piston, during combustion of the compressed gases, a detonation suppressing space will be formed between the piston and the cylinder head in the portion remote from the spark plug, thereby permitting the use of unusually high compression ratios without detonation, as well as reducing bearing loads at this point of the cycle; to provide an improved angular relation of the spark plug to the combustion chamber to permit 100% water cooling around the valves, with a novel arrangement of the plug with respect to the intake and exhaust valves; resulting in more effective cooling of the latter and affording easy access to the plugs; to so predetermine the area of the combustion chamber that the flame front will travel from the point of initial ignition to the last portion of the combustible gases without causing temperature rises sufficient to produce spontaneous ignition in any unburned portion of the gases ahead of the flame front; and, by reason of the narrow combustion chamber and short flame travel from the spark plug, to obtain flame propagation which is comparable to that obtained from the use of dual ignition.

A more general object resides in the provision of an improved engine cylinder head which affords increased engine power output with a greatly reduced tendency toward detonation, thereby permitting use of higher compression ratios even with fuel of relatively low octane rating. A substantial reduction in heat losses to the cooling medium is also effected thereby permitting the use of low capacity engine heat radiating facilities and, in general, providing a cool running high performance engine particularly for heavy duty operation as in large trucks and buses.

Other objects and advantages will become apparent from the following description when considered with the accompanying drawings, and from the appended claims.

In the accompanying drawings, in which like reference numerals are used to designate similar parts throughout, there is illustrated a suitable embodiment for the purpose of disclosing the invention. The drawings, however, are for the purpose of illustration only and are not to be taken in a limiting or restrictive sense as it will be apparent to those skilled in the art that various changes in the illustrated embodiment may be resorted to without exceeding the scope of the invention.

In the drawings:

Figure 3 is a longitudinal sectional view on the line 3—3 of Figure 1;

Figure 4 is a transverse sectional view on the line 4—4 of Figure 1; and

Figure 5 is a transverse sectional view on the line 5—5 of Figure 1.

It will be understood that the engine cylinders may be positioned vertically or horizontally and in intermediate positions in use, and the references to top and bottom surfaces herein are merely for convenience of description with respect to the drawings.

Figure 1:
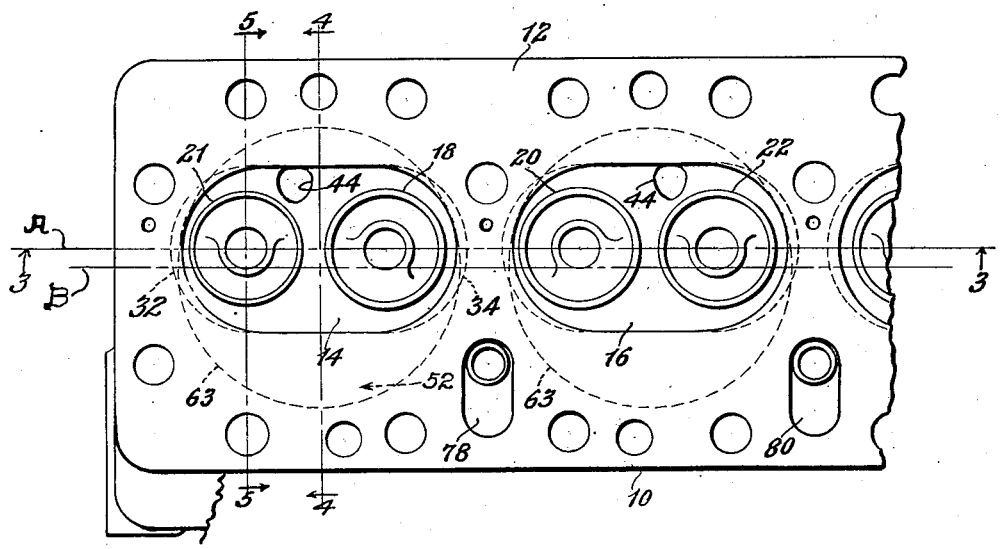
Figure 1 is a bottom plan view of a fragmentary portion of an engine cylinder head constructed according to the invention.

With continued reference to the drawings, 10 generally indicates the improved cylinder head having a plane, inner or bottom surface 12 adapted to cooperate with the plane outer or top surface of the cylinder block of an engine to compress a gasket between the cylinder head and cylinder block in the usual manner. A plurality of combustion chambers, two of which are indicated at 14 and 16 in Figure 1, are formed by recessing the inner or bottom surface 12 of the head and are provided in their upper walls with intake valve seats, as indicated at 18 and 20 and exhaust valve seats as indicated at 21 and 22. The valve seats it will be noted are entirely within the projected area of the cylinder bore. The cylinder head is substantially rectangular in plan form and has substantially straight side and end walls connected by curved corner portions, as is clearly illustrated in Figure 1.

Figure 2:
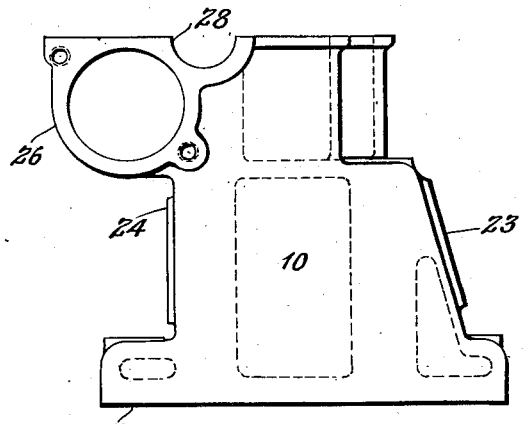
Figure 2 is an end elevational view of the cylinder head shown in Figure 1.

Above the bottom surface 12, the head comprises an integral structure formed to provide intake and exhaust gas passages, the outer ends of which open through opposite sides of the cylinder head as indicated at 23 and 24 in Figure 2, cooling fluid passages, valve stem guides, a cam shaft housing, as indicated at 26, provided with suitable bearing supports, and rocker arm supports as indicated at 28. A cover member, not illustrated, fits on the top end surface of the cylinder head and encloses the cam shaft, rocker arms and valve springs.

The combustion chambers, intake and exhaust gas passages, valve guide supports and other structural features of the improved cylinder head are shown in greater detail in Figures 3, 4, and 5 to which reference may now be had.

As shown in Figure 3, the combustion chamber 16 has a length at the surface 12 which is substantially equal to the diameter of the bore of cylinder 30 and a depth approximately equal to or slightly greater than twice the maximum valve lift as indicated by the dimension A'.

The ends of the combustion chamber are cut back, as indicated at 32 and 34, to provide an arcuate groove in the end portions of the chamber. Each groove has a curved cross sectional shape, as clearly shown in Figure 3, the upper portion of the curve comprising an arc terminating in a plane which substantially includes the periphery of the corresponding valve when in its seated or closed position. These cut backs or grooves in the end portions of the combustion chamber, together with the disposition of the valve seats and valves wholly within the projected area of the cylinder bore provide induction and eduction passages around the respective valves and permit the intake and exhaust gases to flow smoothly around the edges of the valves adjacent the ends of the combustion chamber in a substantially streamlined manner substantially without eddy currents or turbulence which would tend to resist flow of gas past the valves into and out of the cylinder during engine operation. As is clearly shown in Figure 1 the grooves 32 and 34 are generally crescent shaped in form and taper smoothly into the straight parallel side walls of the combustion chamber substantially at the locations where the side walls are intersected by the center lines of the valve seats 18 and 21, transverse to the combustion chamber. It will be noted that at the lower open side of the combustion chamber the opposite end walls thereof which contain the end portions of the grooves of passages 32 and 34 are eccentrically curved with respect to the intake and exhaust valve ports respectively, gradually diverging therefrom to the opposite side walls of the combustion chamber. The grooves 32 and 34 are also preferably eccentric to the valve ports to facilitate the rapid eduction of exhaust gases and the more uniform distribution of the induced charge throughout the area of the combustion chamber.

Above the valve seats the curved walls of the intake and exhaust gas passages, as indicated at 36 and 38 in Figure 3, taper inwardly to the lower ends of the valve stem guides 40 and 42.

Figure 4 shows a cross sectional view of the head taken along a transverse plane including the center of the threaded spark plug receiving bore 44 for combustion chamber 14. In order to provide space for the spark plug the correspondingly located portion of the side wall of the head is indented inwardly of the spark plug receiving bore from the plane of said wall, indicated at 46 in Figure 5, to the position indicated at 48 in Figure 4.

The bottom wall 50 of this indentation is inclined at approximately 60 degrees from the plane of the bottom surface 12 which gives the center line of the spark plug receiving bore an inclination of approximately 30 degrees to a plane perpendicular to the bottom surface 12. This causes the portions of the spark plug outside of the cylinder head to project upwardly and outwardly relative to the head base and makes them readily accessible for insertion or removal. The spark plug bore 44 enters the combustion chamber 14 at the juncture of the top wall with one of the side walls of the combustion chamber at a location between the intake and exhaust valve seats but nearer the exhaust valve seat, as is clearly shown in Figure 1. This location disposes the spark gap of the spark plug nearer to the hottest part of the combustion chamber, and opposite the detonation suppressing space 52 formed between the inner surface of the head and the outer or top surface of the piston. By causing ignition to take place at this part of the combustion chamber the danger of pre-ignition and consequent detonation is substantially reduced for reasons to be later explained.

The intake gas passage 54 of Figure 5 extends substantially smoothly from its outer end 23 to the valve seat 18, the only obstruction in this passage being constituted by the lower end of the corresponding valve stem guide 40. This obstruction is reduced to a minimum and smoothly curved into the contour of the passage so that a minimum turbulence will be caused in the gas as it flows through this passage from the intake manifold to the combustion chamber.

Figure 5 shows a transverse sectional view of the cylinder head at a station corresponding to the center line of an exhaust gas passage 58 and also clearly illustrates the shape of the exhaust gas passage, the curved wall 60 of which extends smoothly between valve seat 21 and its outer end 24 and merges smoothly with the lower end of exhaust valve stem guide 42. The intake which is perpendicular to passage 54 is inclined somewhat upwardly from the valve seat 18 which facilitates the gravity flow of any condensate in the passage to the combustion chamber. The smoothly curved wall of this intake passage provides for even distribution of the intake gas around the valve and, together with the under cut as the corresponding end portion of the combustion chamber, facilitates the smooth streamline flow of intake gas into the engine cylinder with a minimum of turbulence and resistance. This combined with the widely spaced valves and with a similar uniform outward flow of exhaust gas from the combustion chamber through the exhaust gas passage permits the advantageous use of an overlap of the open phases of the exhaust and intake valves during which time the inertia of the exhaust gas causes the entry of the new charge to the combustion chamber before the suction stroke of the piston begins. The overlap is sufficiently brief that the exhaust valve closes before any of the intake gas flows out through the exhaust gas passage. By thus extending the open phase of the intake valve the volumetric efficiency of the engine is improved with a corresponding increase in power output from fuels of low octane rating.

As is clearly shown in Figures 1, 3, and 4, the combustion chambers as indicated at 14 and 16 have a very small area compared to the area of the head of piston 62. When a piston is at the top or outer end of its compression stroke substantially all of the fresh charge is compressed into the corresponding combustion chamber above the gases remaining in the engine cylinder. Owing to the small volume and area of these combustion chambers, the distance of flame travel therein is greatly reduced, providing for the efficient use of one spark plug. The portions or spaces 52 communicating respectively with the combustion chambers being, in each case, remote from the point of ignition, each form a shallow combustion space in each chamber, having a large area in proportion to its volume, thereby preventing excessive temperatures and rates of flame propogation during the last stages of combustion in each cylinder. This feature in connection with the means for cooling the valves effectively obviates possible pre-ignition or detonation of the gaseous charge.

Thus avoidance of detonation and the even burning of the fuel at combustion chamber temperatures, materially below the average temperatures obtaining when even partial detonation occurs, produces a condition of high thermal efficiency in which most of the calorific value of the fuel is converted into useful work and a comparatively small portion is lost through the cylinder head and the cooling medium.

The angular relation of the spark plugs relative to the combustion chambers permits the cooling fluid space to extend entirely around the spark plug bores and affords easy access to the spark plugs for servicing.

From reference to Figure 1 it will be noted that the common center line A of the intake and exhaust valves is transversely offset from the common center line B of the engine cylinder bores 63. Thus the short initial flame of ignition is located at that side of the narrow combustion chambers 14 and 16, which is most distantly spaced from the cylinder center line B. Therefore, as the piston moves downwardly flame propagation will take place progressively over the entire area of the piston, resulting in complete combustion of the gaseous mixture. This considerably reduces the tendency to detonate and at the same time materially reduces the bearing loads at the dead center point of the cycle.

Thus, my new cylinder head construction effects controlled burning of the charge which utilizes the fullest possible energy of the fuel while avoiding pre-ignition or detonation, and materially increases the developed power per pound of engine weight and per pound of fuel; and provides a power plant of the high compression type which may be economically and successfully operated with fuels of comparatively low octane rating.

From an inspection of Figures 3, 4 and 5 it is clear that the combustion chambers, the inlet and exhaust passages, and the spark plug receiving bores are substantially surrounded by cooling fluid.

As shown in Figure 3, there is a large cooling fluid space at each side of each pair of passages and an adequate space between the two passages of each pair. The large spaces extend down around the sides of the combustion chamber and the intermediate space extends across the top thereof.

Each spark plug receiving bore is entirely surrounded by cooling fluid space as indicated at 64 and 66 in Figure 4. Since the indentations for the spark plug receiving bores are between adjacent inlet and exhaust passages, they do not interfere with the free circulation of cooling fluid around the bores, the space in the region between a spark plug bore and an adjacent intake passage being indicated at 68 in Figure 5. The cooling fluid space also extends above and below the exhaust passages as at 70 and 72, and above and below the intake passages as at 74 and 76, in Figure 5. The cooling fluid space extends continuously longitudinally of the cylinder head and is connected at numerous points with the space in the cylinder water jacket by suitable passages as indicated at 78 and 80 in Figure 1.

As the cooling fluid flows through the cylinder head in comparatively large volume because of the large aggregate cross sectional area of the spaces within the cylinder head, the irregular shape of this space causes the fluid to move in the various directions along the space walls eliminating steam or vapor pockets and consequent hot spots and facilitating uniform heat dissipation through said walls.

While the above detail description has been mainly with reference to a single combustion chamber and its associated intake and exhaust gas passages and spark plug receiving bore, the head structure for an engine having its cylinders cast enbloc is continuous for the length of the cylinder block and contains a number of combustion chambers and associated ports corresponding to the number of engine cylinders.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an internal combustion engine, a cylinder having a piston therein; a head closing the cylinder bore and having a combustion chamber in communication with the cylinder bore and elongated diametrically thereof; intake and exhaust valves mounted in the outer wall of said chamber adjacent each end thereof; the end walls of said combustion chamber being shaped to form induction and eduction passages circumferentially of the valve ports and extending around the intake and exhaust valves respectively axially thereof in the open positions of said valves between the cylinder bore and the respective valve ports, the portions of said end walls forming the terminal portions of said passages being eccentrically curved at the open side of said chamber with respect to said intake and exhaust ports.

2. The cylinder head structure defined in claim 1 in which the seats for said valves are wholly within the projected cylinder area.

3. The cylinder head structure defined in claim 1 in which the longer dimension of said combustion chamber at the open side thereof is substantially equal to the diameter of the engine cylinder bore.

4. The cylinder head structure defined in claim 1 in which the longer dimension of said combustion chamber at the open side thereof is substantially equal to the diameter of the engine cylinder bore and wherein the passages formed in said end walls of the combustion chamber are eccentrically curved with relation to the intake and exhaust ports and merge with the side walls of said chamber.

5. The cylinder head structure defined in claim 1 in which walls of said passages define continuous arcs in vertical section having a length which is substantially co-equal with the depth of said chamber.

6. In an internal combustion engine, a cylinder having a piston therein, a head closing the cylinder bore and having an elongated combustion chamber in communication with said bore, intake and exhaust valves mounted in the outer wall of said chamber, the longitudinal center line of said chamber being coincident with the valve centers and transversely offset from the center of the cylinder bore, and said combustion chamber on the center line thereof having induction and eduction passages in its end walls forming gas flow directing means around the intake and exhaust valves respectively at opposite sides of the engine cylinder bore.

7. The cylinder head structure defined in claim 6 in which said structure is provided with a spark plug receiving bore obliquely inclined downwardly through the outer wall of the combustion chamber at its juncture with the side wall thereof most remote from the center of the cylinder bore, and detonation suppressing space between the outer surface of said piston and said cylinder head, whereby upon ignition the flame front will be directed obliquely toward said piston and said detonation suppressing space.

8. A cylinder head for an internal combustion engine having a plane inner surface and an integral structure outward of said surface having a narrow elongated combustion chamber opening on said surface and provided with gas flow directing grooves in its opposite end walls, a pair of valve seats in the outer wall of said chamber; intake and exhaust gas passages leading one to each of said valve seats from the exterior of said cylinder head; and cooling fluid passages completely surrounding said valve seats and spark plug.

9. A cylinder head for an internal combustion engine having a plane inner surface and an integral structure outward of said surface having a narrow elongated combustion chamber opening on said surface and provided with gas flow directing grooves in its opposite end walls, a pair of valve seats in the outer wall of said chamber; intake and exhaust gas passages leading one to each of said valve seats from the exterior of said cylinder head; and cooling fluid passages completely surrounding said valve seats, said structure having a spark plug receiving bore extending from the exterior of the cylinder head to said combustion chamber adjacent one of said valve seats, the centerline of said bore being inwardly and downwardly inclined relative to the axis of the valve seat.

EDWARD A. WINFIELD.